Sept. 20, 1971   W. E. ANGLIN ET AL   3,606,379
STABILIZED MOTOR VEHICLE AND STABILIZING DEVICE THEREFOR
Filed July 31, 1969   2 Sheets-Sheet 1
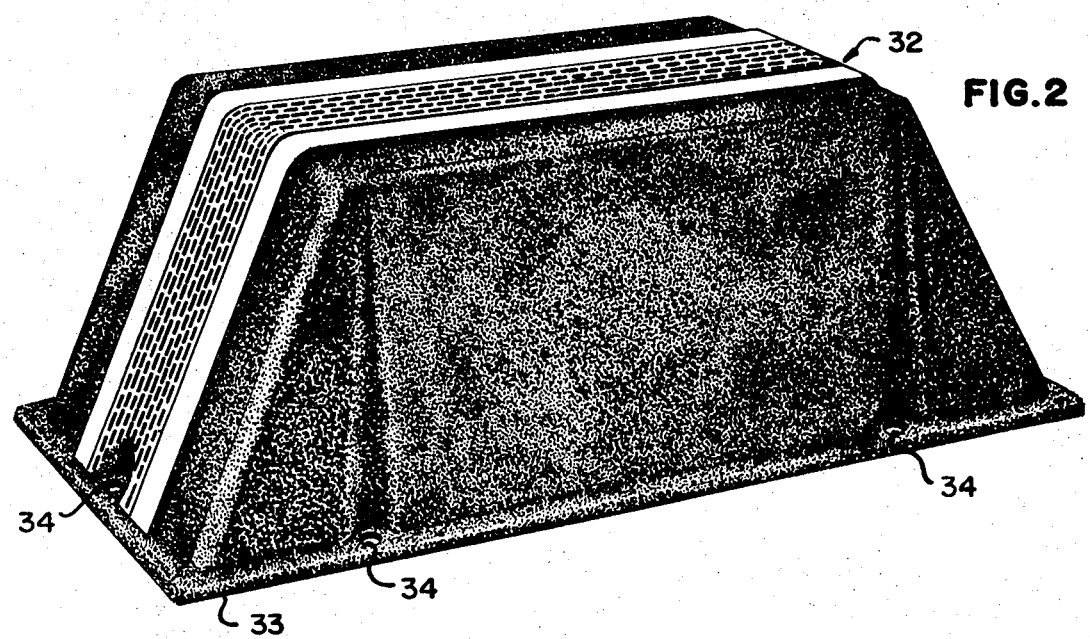
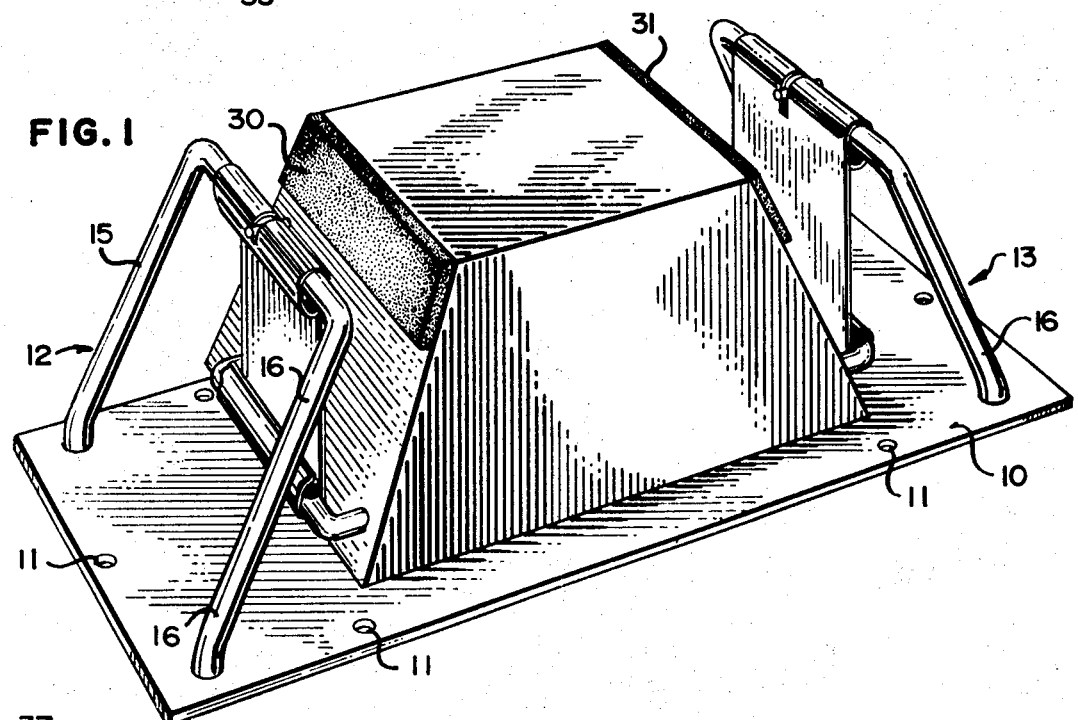
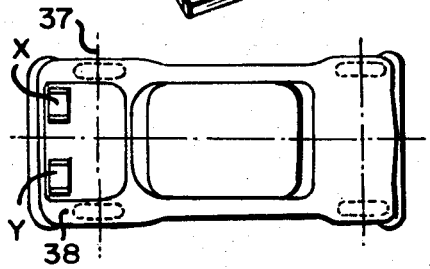
INVENTORS
WILLIAM E. ANGLIN
& PAUL E. ANGLIN
BY Lowry, Rinehart & Markva
ATTORNEYS

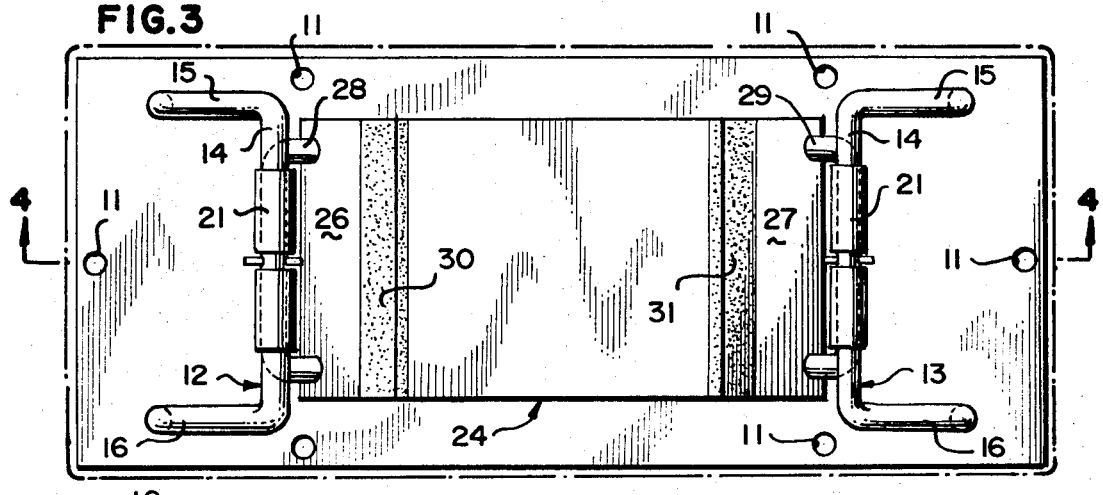
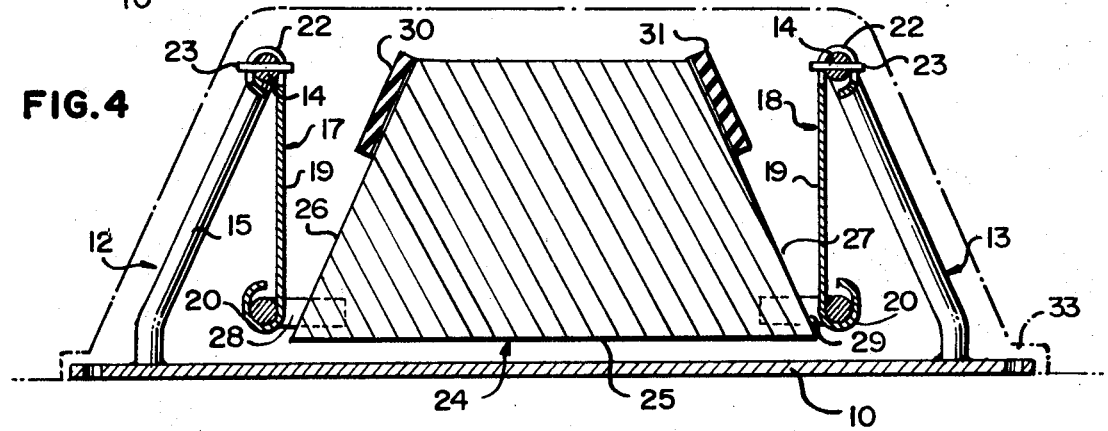
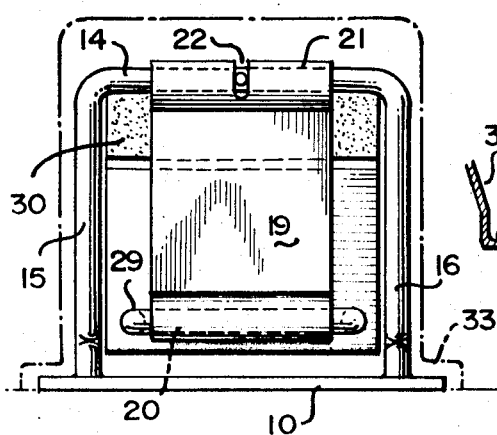
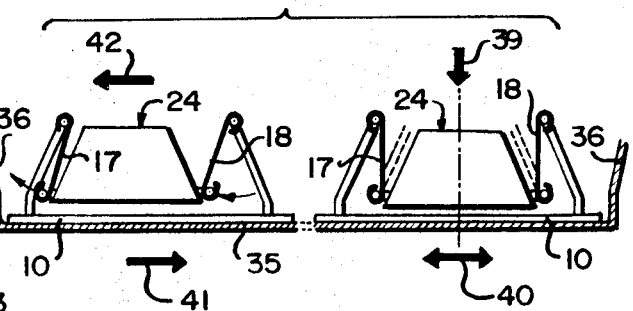

United States Patent Office 3,606,379
Patented Sept. 20, 1971

3,606,379
STABILIZED MOTOR VEHICLE AND STABILIZING DEVICE THEREFOR
William E. Anglin and Paul E. Anglin, Dallas, Tex., assignors to William E. and Paul E. Anglin and Trammell Crow Investment Company, all of Dallas, Tex., fractional part interest to each
Filed July 31, 1969, Ser. No. 846,480
Int. Cl. B60m 27/00
U.S. Cl. 280—150D
14 Claims

ABSTRACT OF THE DISCLOSURE

A stabilized, wheeled motor vehicle using a pair of pendulum-like weight masses so positioned as to provide a new geometry of stability for such vehicles. The invention also involves a new and improved stabilizing device. This device includes a base mounting plate or frame from which project upwardly a pair of spaced supporting brackets. A heavy weight mass is suspended from these brackets for swinging movement longitudinally only of the base plate. The pair of pendulum-like masses are positioned on the floor of the vehicle body as closely as possible to the rear corners, with the base plates positioned transversely of the longitudinal axis of the vehicle. The swinging pendulum movement of the weight masses thus takes place transversely of the vehicle body, with no fore and aft movement. The spaced units so placed balance and stabilize the vehicle, providing positive control during blow-outs, wet surface skids, emergency stops, and vehicle sway caused by soft shoulders and rough road surfaces, preventing or reducing vehicle skidding.

BACKGROUND OF THE INVENTION

The matter of motor vehicle stability under widely varied conditions of vericle use and movement has always been a matter of substantial concern, but a number of factors have caused increased interest in this area. High accident tolls have caused private groups and government agencies to insist on higher safety standards, a stronger effort to analyze and control the causes of vehicle accidents and the design and production of safer equipment. The tendency to smaller and lighter cars, while retaining high speed and high horsepower outputs, has considerably increased the problem of vehicle stability. A continually repeated circumstance of high speed expressway accidents has been that a vehicle has suddenly gone out of control, leaving its normal travel lane and intersecting the paths of other high speed vehicles. Since the causative factors here mentioned are not likely to change, it is evident that increased attention needs to be given to ways of improving vehicle stability.

There are a number of conditions which create problems of vehicle stability, not all of which are under the control of the driver of the vehicle and not all of which may be anticipated. For example, a blow-out at turnpike speeds creates a tremendous yawing effect on the vehicle. The tendency is for the rear end to suddenly sway sideways, and if control is lost before the vehicle can be properly braked, the vehicle may careen across traffic flow or into collision with road obstacles. It is important, therefore, to find a way to increase the stability of the back end of a vehicle under blow-out conditions until the vehicle can come to a safe controlled stop.

A substantial problem occurs on roads having slick surfaces, caused by rain, snow or ice. The braking of a vehicle on such a surface very easily causes the back end of the vehicle to slew or swing sideways. In such cases, the vehicle usually swings completely around until it faces the opposite direction from the original direction of travel. It is necessary, therefore, to find a way to stabilize the back end of a vehicle under these conditions so it will retain its original direction of movement, or at least make a controlled turn around any road obstacle.

The same problem arises in the case of a high speed emergency stop, since even though the road may provide a good traction, the nose of the vehicle tends to dive and the rear end tends to swing around, changing the direction of movement of the car and causing it to move quickly into a condition where control is completely lost, with the usual disastrous results. It is necessary, therefore, to increase the stability of the back end of a vehicle under such emergency stop conditions.

A further condition providing substantial difficulty is a soft or washed-out road shoulder. If, inadvertently, the right wheels leave the hard surface of the road, especially at high speeds, it is difficult to retain vehicle stability. It is important, therefore, to stabilize the vehicle until speed can be reduced, and the hard surface of the road regained.

Still another cause of vehicle instability are road bumps, dips and potholes, which create sidewise sway, at times under harmonic conditions, that accentuate vehicle movements until an out-of-control condition exists. It is desirable, therefore, to provide a stabilizing means which will counteract the sway forces and assist in stabilizing the vehicle under these rough road conditions.

One of the basic characteristics of instability, therefore, is the tendency for the rear of the vehicle to move out of proper alignment with the front wheels, and the control of this movement is essential to preventing or curbing vehicle instability. There appear to be a number of causes for this tendency, some of which are specifically inherent in the nature and construction of the vehicles involved and some in the vehicle drive. The majority of road vehicles have independent front wheel suspension and a stiff rear axle with differential gearing, one rear wheel or the other normally driving the vehicle depending upon the direction of its travel. The geometry of stability, therefore of the average vehicle, is a matter of triangulation with the two front wheels of the vehicle serving as two apices of the triangle, the third apex falling at the rear of the vehicle somewhere over the center of the axle or the center of the trunk area. The rear axle being a rigid unit, conforms to the road surface, the right side of the axle being raised slightly as the result of the drive torque of the vehicle. Therefore, the front wheels of the standard motor vehicle are the main stabilizing points of the vehicle. The forward drive torque of the rear vehicle wheels causes the front end of the car frame to be pushed down towards the road surface, increasing traction engagement of the front wheels with the road but with the rear wheels failing to have the desired traction. This condition is further aggravated by the fact that in most vehicles the heavy engine is adjacent the front wheels of the vehicle, and by the further fact that under most conditions of driving, passenger weight is in the front seat rather than in the rear. It is also noted that upon braking of the vehicle at relatively high speed, the nose of the vehicle tends to depress substantially, highly increasing the road traction at the front of the car but reducing road traction at the rear of the vehicle where it is most urgently needed. These basic conditions inherent in the road use and structure of motor vehicles have been highly difficult to solve, and the efforts of the prior art have failed to produce a practical and useful solution for achieving or aiding vehicle stability.

One of the methods asserted for achieving stability has been the use of a shifting weight mass such as found in U.S. Pats. 2,633,368, 2,701,144 and 2,990,193.

SUMMARY OF THE INVENTION

It is an object of the present invention, therefore, to provide a motor vehicle with stabilizing means so constructed and positioned as to change the normal triangular geometry of stability of the vehicle to a rectangular geometry which significantly and substantially increases the stability performance of the vehicle under the various road conditions above mentioned. This is accomplished by the novel positioning within the vehicle of a pair of identical stabilizing devices which work harmoniously and in a synchronous manner to react against and compensate for the separate movements of the vehicle.

It is an object of the invention to provide a vehicle with stabilizing means so positioned and constructed that the units involved may be mounted on the vehicle without requiring vehicle modification, without affecting road clearance and without interfering substantially with the usable space in the vehicle structure.

It is a further object of the invention to provide a stabilizing means involving improved stabilizing devices which are unencumbered by springs or other centering devices, and which work continuously at counteracting any erratic movements of the vehicle, balancing and stabilizing the vehicle for a smoother ride and more positive control.

Still another object of the invention is an improved stabilizing device which reacts to lateral movements of the vehicle, but not longitudinal movements, which utilizes a free pendulum-like movement and the force of gravity to counteract vehicle body movement, and which is protected from dust and dirt and interference by extraneous objects. The installed units in no way jeopardize the safety of passengers in the vehicle, because of the construction and location thereof and in fact the positioning of the devices provides added protection to vehicle passengers against collision from the side and rear.

DRAWINGS

The invention is shown in the accompanying drawings, wherein

FIG. 1 is an isometric view of the stabilizing unit of the present invention with the cover removed to clearly disclose the working parts of the unit;

FIG. 2 is an isometric view of the cover for the stabilizing device;

FIG. 3 is a top plan view of the unit with the cover shown in phantom by dotted lines;

FIG. 4 is a longitudinal section taken through the stabilizing device on the line 4—4 of FIG. 3, with the cover again shown in phantom;

FIG. 5 is an end elevational view of the unit;

FIG. 6 is a fragmentary diagrammatic view of a portion of a vehicle luggage compartment with a pair of stabilizing devices of the present invention mounted at spaced points on the floor of the compartment, showing the devices as located in the corners of the compartment adjacent the rear wheel housings; and FIG. 7 is a diagrammatic view of a passenger motor vehicle with a pair of the stabilizing devices of the invention mounted therein, showing the position of the devices in the rear corners of the trunk or luggage compartment and particularly illustrating the position of the devices relative to the rear wheels and rear axle of the vehicle.

DESCRIPTION OF PREFERRED EMBODIMENT

In the preferred embodiment of the invention as shown in the drawings, the stabilizing device comprises a base plate or frame 10 which is provided with a plurality of fastening apertures 11 spaced around the marginal edges thereof. Extending upwardly from the base plate 10 are a pair of spaced supporting bracket arms 12 and 13. The bracket arm 12 is preferably U-shaped with a bight portion 14 connecting bent legs 15 and 16. These legs are bent inwardly as shown for reasons which will later be more fully described. The bracket arm 13 is identical in construction to the bracket arm 12.

Pivotally attached, as suspending means, to the bight portions 14 of the supporting bracket means are suspension links 17 and 18. Each of these links is composed of a relatively broad strip 19 of high strength material. The lower end of strip 19 is bent back upon itself as at 20 to provide a pivot bearing journal. The upper end of the strip is bent back upon itself as at 21 to provide a bearing journal which is in pivotal engagement with the bight portions 14 of the supporting bracket means. The turned upper end of the suspension links 17 and 18 are each provided with an elongated slot 22, and a centering pin 23 extends through the bight portions 14. The purpose of this pin is to center the links on the bight portion between the legs 15 and 16. The elongated slots permit full pivotal movement of the links about the bight portions 14.

Positioned between the links 17 and 18 is a weight mass 24. This weight mass is preferably of high density material, such as steel or lead, and is preferably of trapezoidal shape in longitudinal section, with the base 25 positioned downwardly near the base plate or frame 10. The inclined ends 26 and 27 of the weight mass are provided with U-shaped pivot rods 28 and 29, respectively. The bight portions of the U-shaped pivot rods are journaled in the turned ends 20 of the links 17 and 18, and the free ends of the legs are molded into the body of the weight mass 24. Also on the ends 26 and 27 respectively of the weight mass are secured resilient bumper elements 30 and 31.

It will be noted from FIG. 4 that when the weight mass 24 is in centered position between bracket arms 12 and 13, the suspension links 17 and 18 are substantially perpendicular to the base plate 10. Because of this arrangement, whenever the weight mass 24 goes in either direction longitudinally of the base 10, the weight mass must move upwardly against the pull of gravity and gravity will tend to return the weight mass in a direction opposite to the original direction of movement.

In order to protect the working components of the stabilizing device, there is provided a cover 32, shown in FIG. 2 of the drawings. This cover is provided with a flange 33 which extends outwardly and then downwardly to fit snugly over the edges of the base plate 10, as shown in FIG. 4. Apertures 34 in the cover flange correspond exactly with fastening apertures 11 in the base plate, so the fastenings used to secure the stabilizing device in operative position pass through both the cover and the base plate. The cover 32 is preferably of tough plastic and corners and edges are well rounded so as to prevent any damage to luggage or the like which might be placed in the trunk compartment of the vehicle.

The present invention not only involves the improved stabilizing device described above, but it is also concerned with a novel combination of a pair of such devices with a vehicle body to provide a new geometry of vehicle stabilization, and thus a stabilized vehicle having new and unexpected properties.

FIGS. 6 and 7 of the drawings show in schematic disclosure the combination of an identical pair of the stabilizing devices with the vehicle structure which provides the new and improved result.

FIG. 6 discloses in fragmentary form the mounting of a pair of the stabilizing devices on the floor of the vehicle trunk as close as possible to the rear wheel housings. FIG. 7 shows the positioning of a pair of stabilizing devices relative to the vehicle body as far as possible behind the vehicle axle and as far as possible into the rear corners of the trunk compartment.

With specific reference to FIG. 6, a pair of stabilizing devices, with their covers removed to clarify the operation of the devices, is shown positioned on the floor 35 of the vehicle luggage compartment. The base plates 10 of each of the stabilizing devices extend transversely of the longitudinal axis of the car body and are carefully aligned so that the path of movement of the weight masses 24 is as closely perpendicular to the longitudinal axis of the vehicle as possible. Further, the ends of the base plate 10 are set as closely as possible into the rear corners of the trunk compartment, adjacent wheel housings 36.

With specific reference to FIG. 7 and the diagrammatic showing of the car body, dotted line 37 represents the rear axle of the vehicle. Reference numeral 38 identifies the trunk compartment, and it will be noted that the units, as mentioned above, are positioned as far as possible into the outer rear corners of the trunk compartment. Each of the devices is securely fastened to the floor of the trunk compartment by fastenings extending through the apertures 34 and 11 which are easily and quickly applied.

OPERATION

The operation of a motor vehicle equipped with the stabilizing devices, and of the stabilizing devices themselves, is illustrated in the fragmentary showing of FIG. 6 and will also be clearly understood from the showings of FIGS. 1 and 4 of the drawings. The diagrammatic illustration of FIG. 6 is not intended to show how the two units normally work synchronously together, but the units there portray several positions to better illustrate the movement of the devices.

It will be noted from FIGS. 1 and 4 that when a vehicle carrying the stabilizing devices is moving forward without any lateral forces being exerted thereon, the weight mass 24 will assume the position shown in FIGS. 1 and 4, centered between the supporting arms 12 and 13 with the suspension links 17 and 18 substantially vertical to the base plate 10. This condition is also shown at the right-hand side of FIG. 6. Arrow 39 represents the force of gravity acting downwardly on the weight mass 34. Arrow 40 represents the direction of lateral movement in either direction of the weight mass, depending upon the force acting upon the vehicle. The dotted line positions show the possible movement of the weight mass in either direction, and it will be noted that any movement in either direction causes the weight mass to lift upwardly against the force of gravity.

In the event of vehicle sway caused by any of the several road conditions discussed above, as for example, in the direction of the arrow 41, the vehicle body will move in the direction of the arrow. The weight mass 24, however, will tend to maintain its position in space, and because of the movement of the vehicle body, it will tend to have relative movement to the floor 35 of the vehicle in the direction of arrow 42. The links 17 and 18 will pivot about bight portions 14 of the supporting bracket arms, and will also pivot about pivot rods 28 and 29 on the weight mass. The weight mass 24 will be lifted up against the pull of gravity, and if the lateral force is sufficient, the said mass will move in the direction of the arrow 42 in FIG. 6 until the bumper 30 engages the bight portion 14 of the bracket arm and the turned upper end 21 of the suspension link 17. This engagement will stop the movement of the weight mass and it will move no further until it starts its return swing in a direction opposite to that of the arrow 42. The pull of gravity immediately tends to move the weight mass in a pendulum-like movement in the opposite direction to that of the arrow 42, which will exert a substantial force on the vehicle body, damping the swaying movement of the vehicle and tending to hold the vehicle in a straight line forward course. It is particularly noted that the weight mass is free to move longitudinally of the base plate 10, and thus laterally of the vehicle, but it is restrained by the elongated pivot bearing points from swinging movement transversely of the base plate 10 and fore and aft of the vehicle.

The stability geometry of the vehicle as combined with a pair of stabilizing devices may be best understood with reference to FIG. 7. The positioning of the stabilizing devices X and Y in the corners of the vehicle trunk places a weight mass at each rear corner of the vehicle. The devices X and Y, therefore, become stability points at the rear of the vehicle corresponding to the stability points at the front wheels of the vehicle. The geometry of stability is rectangular, rather than triangular as is the case when the vehicle body is not equipped with the stability devices of the invention. There are a number of substantial advantages to the improved geometry. The devices X and Y are identical, with the same harmonics characteristics. Accordingly, they tend to work together to counteract any sudden lateral movements of the vehicle body. On the other hand, since there are two separate devices, if separate complex or varied forces are working on the vehicle body, each device is capable of separate and independent movement to counterbalance the separate forces. The weight of the devices X and Y placed as far as possible to the rear of the axle line 37 of the vehicle assists in counteracting the torque produced by the drive wheels of the vehicle, as well as that produced by the depression of the front end of the vehicle under sudden emergency braking conditions. Any return movement of the weights caused by the force of gravity has the added effect of momentum, which tends to bear down heavily on the rear of the vehicle, creating additional downward forces on the axle and the result is increased traction at the rear vehicle tires. It will be noted that the construction of the stabilizing device, namely, with the supporting brackets extending upwardly from a base plate 10, provides not only a structure which may be mounted on the floor of the vehicle, but the supporting bracket arms act as stops for the weight mass, capable of absorbing the substantial forces generated. The construction of the device is such that no changes in vehicle structure are required. Installation may be accomplished with a set of self-tightening screws without any mechanical experience. There is no interference with the road clearance of the vehicle.

Actual use and tests of the device have demonstrated that the stabilized vehicle and the stabilizing devices mounted thereon provide a material increase in safety, eliminate or substantially reduce the loss of control under emergency conditions, and substantially increase comfort in the driving of the vehicle over rough roads.

What is claimed is:

1. A vehicle stabilizing device including,
   a base plate;
   a pair of spaced, supporting bracket means extending rigidly upward from said base plate and each said bracket means having at the upper portion thereof a single horizontally positioned pivot member;
   a weight mass positioned between said bracket means; and
   means for suspending said weight mass from said horizontally positioned pivot members of said bracket means and permitting a swinging pendulum-like movement between said bracket means in a direction longitudinally of said device while preventing swinging movement of said weight mass transversely of said device.

2. A stabilizing device as set forth in claim 1;
   said supporting bracket means each being substantially of inverted U-shape having a bight portion constituting said horizontally positioned pivot member with said suspending means being pivotally attached to the bight portion of each of said bracket means.

3. A stabilizing device as set forth in claim 2;
   the leg portions of each of said bracket means being spaced apart a distance greater than the width of said weight mass, whereby portions of said weight mass and said suspending means may move freely through said bracket means.

4. A stabilizing device as set forth in claim 2;
   the leg portions of each of said bracket means being inclined inwardly toward each other.

5. A stabilizing device as set forth in claim 4;
said suspending means being substantially vertically positioned relative to said base plate when said weight mass is in centered position between said spaced bracket means.

6. A stabilizing device as set forth in claim 5;
said weight mass being substantially trapezoidal in longitudinal section with the base thereof positioned downwardly.

7. A stabilizing device as set forth in claim 1;
said weight mass carrying resilient bumper means on opposite longitudinal ends engageable with said bracket means adjacent thereto in the event that a movement is imparted to said stabilizer device of sufficient magnitude as to cause said weight mass to reach the limits of its swinging movement.

8. A stabilizing device as set forth in claim 1;
said supporting bracket means each being inclined inwardly one towards the other;
said suspending means each being substantially vertically positioned relative to said base plate when said weight mass is in centered position between said spaced bracket means.

9. A stabilizing device as set forth in claim 1;
said suspending means including rigid links each pivotally connected to one of said bracket means and one end of said weight mass, respectively.

10. A stabilizing device as set forth in claim 1;
said suspending means including relatively wide rigid links each pivotally connected by elongated pivot means to one of said bracket means and one end of said weight mass, respectively.

11. A stabilizing device as set forth in claim 1;
said suspending means including rigid links each pivotally connected to one of said bracket means and one lower end of said weight mass, respectively;
said rigid links being vertically positioned relative to said base plate when said weight mass is in centered position between said spaced bracket means.

12. A stabilizing device as set forth in claim 2;
said suspending means including relatively wide rigid links each pivotally connected to the bight portions of one of said bracket means and one end of said weight mass, respectively.

13. A stabilizing device as set forth in claim 12;
said rigid links each being substantially vertically positioned relative to said base plate when said weight mass is in centered position between said bracket means.

14. A stabilizing device as set forth in claim 13;
said weight mass being substantially trapezoidal in longitudinal section with the base thereof positioned downwardly.

References Cited

UNITED STATES PATENTS

| | | | |
|---|---|---|---|
| 1,821,816 | 7/1931 | Quass | 280—150D |
| 2,545,578 | 3/1951 | Hanel | 280—150D |

FOREIGN PATENTS

| | | | |
|---|---|---|---|
| 1,092,489 | 11/1954 | France | 280—150D |

BENJAMIN HERSH, Primary Examiner

W. H. DOUGLAS, Assistant Examiner